(12) United States Patent  (10) Patent No.: US 8,866,623 B2
Sharon  (45) Date of Patent: Oct. 21, 2014

(54) ALERT INTERACTIVE SYSTEM

(76) Inventor: Hamolsky Lee Sharon, Solana Beach, CA (US)

( * ) Notice: Subject to any disclaimer, the term of this patent is extended or adjusted under 35 U.S.C. 154(b) by 0 days.

(21) Appl. No.: 13/346,617

(22) Filed: Jan. 9, 2012

(65) Prior Publication Data

US 2013/0135109 A1    May 30, 2013

Related U.S. Application Data

(60) Provisional application No. 61/430,543, filed on Jan. 7, 2011.

(51) Int. Cl.
    *G08B 23/00*    (2006.01)
    *G08B 21/02*    (2006.01)
    *G08B 21/06*    (2006.01)
    *B60K 28/06*    (2006.01)

(52) U.S. Cl.
    CPC ............ *G08B 21/02* (2013.01); *G08B 21/06* (2013.01); *B60K 28/06* (2013.01)
    USPC ............. 340/576; 340/945; 340/963; 701/14; 244/220

(58) Field of Classification Search
    USPC ........... 340/576, 963, 945, 573.1, 575; 701/9, 701/14; 244/220, 228
    See application file for complete search history.

(56) References Cited

U.S. PATENT DOCUMENTS

| | | | |
|---|---|---|---|
| 1,881,878 A | 2/1929 | Nidy | |
| 4,196,412 A | 4/1980 | Sluis et al. | |
| 4,564,833 A | 1/1986 | Seko et al. | |
| 4,879,542 A | 11/1989 | Elsey | |
| 5,243,339 A * | 9/1993 | Graham et al. | 340/945 |
| 5,353,013 A | 10/1994 | Estrada | |
| 5,392,030 A | 2/1995 | Adams | |
| 5,402,108 A | 3/1995 | Tabin et al. | |
| 5,684,455 A | 11/1997 | Williams et al. | |
| 5,900,827 A * | 5/1999 | Graham et al. | 340/963 |
| 6,849,050 B1 | 2/2005 | Russo et al. | |
| 6,903,658 B2 * | 6/2005 | Kane et al. | 340/576 |
| 7,710,279 B1 | 5/2010 | Fields | |
| 7,792,615 B2 * | 9/2010 | Aimar | 701/11 |
| 7,956,757 B2 * | 6/2011 | Kumar et al. | 340/576 |
| 8,188,870 B2 * | 5/2012 | Kumar et al. | 340/576 |
| 2003/0095046 A1 | 5/2003 | Borugian | |
| 2003/0169173 A1 * | 9/2003 | Longere | 340/576 |
| 2009/0267777 A1 | 10/2009 | Kumar et al. | |
| 2012/0075122 A1 * | 3/2012 | Whitlow et al. | 340/963 |
| 2012/0278766 A1 * | 11/2012 | Massengill | 715/846 |

* cited by examiner

*Primary Examiner* — Toan N Pham
(74) *Attorney, Agent, or Firm* — San Diego IP Law Group LLP

(57) ABSTRACT

The present invention provides an alert interactive system designed to serve as an alertness tool to ensure that a person, such as an aircraft pilot, a car or truck driver, a soldier or sailor on watch, or a security professional, remains alert. The alert interactive system provides instructions and time for the person to enter a code, and provides an alert to that person and others when the code is not entered timely and correctly. The present invention indicates when the person is not alert, and may be taking a nap, may be fully asleep, or unconsciousness.

19 Claims, 6 Drawing Sheets

ALERT INTERACTIVE SYSTEM

CROSS REFERENCE TO RELATED APPLICATIONS

This application claims priority under 35 U.S.C. §119(e) to U.S. Provisional Application No. 61/430,543, filed Jan. 7, 2011, and entitled "ALERT INTERACTIVE SYSTEM," the disclosure of which is hereby incorporated by reference in its entirety.

BACKGROUND OF THE INVENTION

1. Field of Invention

This invention relates generally to detecting if a person is alert, and more specifically, to an interactive system and method for alerting that person and others when the person is not alert.

2. Description of Related Art

It is common knowledge in the professional aviation community that pilots routinely nap during flights. FAA regulations prohibit sleeping while on duty. If one of the pilots takes a nap, the other pilot may fall asleep too. In 1989, a National Aeronautics and Space Administration (NASA) survey found that 80 percent of pilots at 26 regional airlines admitted to napping in the cockpit.

In December 2013, new rules for commercial airline pilots which address pilot fatigue will take effect. Mr. John Nance, an Airline Industry Analyst reports: "I'm very distressed over these rules because they don't go anywhere near far enough." Ms. Mary Schiavo, the former Inspector General, Department of Transportation reports: "These new rules do not stop the danger of commuting pilots." Mr. John Nance, the Airline Industry Analyst adds: "New pilots in the first part of their careers are simply not going to tell the truth because they know they are going to get fired or sanctioned if they actually say, Yes, I'm tired." The NTSB, National Transportation and Safety Board, concludes: "Even with the new FAA rules, the issue of tired pilots in the cockpit remains a serious concern." To ensure the safety of the flying public, three professional pilots have reported the following three quotes: "There is a need for the alert interactive system." "The alert interactive system will not let me sleep while I'm on duty." "The alert interactive system will undoubtedly be a major contribution to safety."

This pilot advises that there be a line of defense and security against those who fall asleep in the cockpit. If pilots are asleep at the controls, they will not detect the onset of a system failure (such as a hydraulic leak).

It is known from the news that dangerous items go undetected through airport security. If there is an emergency such as an explosion from a bomb, a hijacking, or cabin depressurization, an immediate response from the pilot is imperative. If a pilot is suddenly awakened by blaring alarm horns and flashing lights, he is at a decided disadvantage. The pilot would have to make decisions without being aware of what happened previously. The pilot would also have to make decisions without having followed the trends of the emergency or without having all the available data. The pilot who was asleep would probably have fewer options and less altitude in which to deal with an emergency. If the pilots were awake, alert, and engaged, they would be aware of the problem from its inception, and could follow proper emergency procedures. If the pilots are awake, alert, and engaged, emergencies can be averted. The U.S. spends millions of dollars on TSA, Homeland Security personnel, Air Marshals, and carry-on and body scanners trying to ensure the safety of the flying public. Ensuring that at least one pilot is awake is critical towards the goal of public safety.

Pilots who are asleep may exhaust their fuel reserves leading to a risky landing. It has been reported that an airliner was requested by air traffic control (ATC) to 'chase down' a wayward aircraft due to sleeping pilots. The wayward aircraft over flew its destination and was flying out to sea. If an aircraft acts as a chase plane, its fuel reserves may be depleted and which would then not be available in the case of an emergency or if flying to an alternate is necessary.

Pilots who are asleep may fly off-course into restricted or unfriendly airspace. In today's volatile political climate, it is imperative pilots stay on-course. Pilots who are asleep lose situational awareness and may fly into mountainous terrain, another aircraft, hazardous weather conditions, etc.

Aircraft passengers have a right to expect that at least one of their pilots, if not both of them, are awake, alert, and engaged. Airline passengers assume that the price of their ticket includes that the pilots are awake.

Owners also have a significant interest in the pilots being awake, alert, and engaged, as a negative event could result in a lack of confidence in the airline, lost customers, and damage to their multi-million dollar aircraft.

Cockpits are very conducive to sleeping. During most of the flight, there is very little activity in the cockpit to keep pilots alert. Most non-pilots do not realize that the cockpit is dark at night except for lights emanating from the instrument panel. Unlike driving a car on a road, during flight there are no headlights, street lights, street signs, billboards, or highway divider bumps to get the pilot's attention. At night, for most of the flight, all the pilot can see out of the windscreen (windshield) is pitch black.

FAA regulations prohibit sleeping while on duty. In 1994, the Federal Aviation Administration (FAA) performed tests related to cockpit napping, and as a result of those tests, considered allowing pilots to nap on certain flights. However, the FAA decided not to pursue this idea because of the public concerns it might raise and the litigation that would result the first time an accident occurred while a pilot was napping. Several recent instances of crashes and mistakes have been documented from pilots who are sleepy or asleep.

The darkened environment that exists in the cockpit also exists for air traffic controllers, in that air traffic control radar facilities are almost pitch black, with the only light coming from a dull green light emanated from radar scopes. Similar darkened conditions exist in air traffic control towers at night. In such a darkened environment, it is easy to understand why pilots and air traffic controllers could fall asleep on the job.

In general, being alert and engaged is important in many other environments besides aircrafts. In cars, the American Automobile Association (AAA) has found that 40% of drivers admit to having nodded off at the wheel. This percentage is likely much higher for professional drivers, such as long haul truck drivers and cab drivers.

Being alert has been important since the Stone Age, where humans sought seeds, bark, and leaves of certain plants, and is still important in present times, where people seek caffeine to ease fatigue and stimulate awareness. Even if a person is not tired, the person can still be distracted, whether it is from conversing with others, or from technology such as text messaging, internet, and television. Further, the person can be sick or in an altered mental state due to alcohol, drugs, or medical conditions. Additionally, the person can be unconscious, whether that is through fainting, delirium, hypnosis, coma, or death. It is also possible that the person can be detained by criminal or terrorist activity. Often, the person is asleep, whether that is from an intentional nap or unintentionally falling asleep. The person can also be semi-asleep or barely awake. The person can be semi-asleep for a period of time (e.g., 30 minutes), where the person is semi to fully relaxed, eyes closed, but still hears noises around him. Being semi-asleep normally happens during some mundane task or dull activity, such as watching a presentation.

When a person is given a mundane task, the person is mentally on cruise control and is often much less likely to stay alert, even though this task may be considered very important (e.g., providing security at a checkpoint). An automobile may be on cruise control, or an aircraft on auto pilot at cruising altitude.

The prior art has attempted to solve this problem in many ways. However, each method has shortcomings. For example, in cars, simple devices such as foot switches which must be kept activated by a driver's foot, or electrical contacts attached to the eyelids of drivers to detect closing of the driver's eyes exist. However, the devices require direct physical contact with the driver and tend to be awkward, uncomfortable, or inconvenient, and thereby end up ineffective due to their disuse in practice. It has been reported that safety systems installed to keep train operators awake have been rigged so the train operator can bypass the alert, safeguard features. Train passengers are at risk.

Also in cars, U.S. Pat. No. 5,402,108 discloses a driver alerting system which plugs into a vehicle cigarette lighter, and after actuation of a reset button, triggers a flashing red warning light after a random period of time. If a user does not actuate the reset button within a predetermined time after the light begins flashing, a horn will sound. U.S. Pat. No. 5,353,013 discloses a vehicle operator sleep alarm that monitors a driver's head position and detects drowsiness after the onset of sleep. U.S. Pat. No. 4,564,833 discloses a device which provides pulses indicative of the steering angle and steering direction, and monitors such pulses for comparison in order to determine that a driver is sleeping. U.S. Pat. No. 5,684,455 discloses a driver alert apparatus that alerts a car driver before he falls asleep. The apparatus includes a green light, a yellow light, and a red light, along with a time cycle, and when the green light illuminates, the driver, if alert, presses a button to restart the sequence. If the driver is not alert, the yellow light flashes given the driver another chance before the red light flashes and triggers an alarm.

Mercedes Benz has developed an Attention Assist passive alert system that includes a steering sensor coupled to smart software that uses 70 parameters to establish a unique driver profile during the first 20 minutes of driving. Between 50 and 112 mph, the system identifies the erratic steering corrections drivers make as they begin to get drowsy and triggers an audible warning such as a "Time for a rest?" message along with a coffee cup icon appearing in the instrument cluster.

In airplanes, Boeing's crew alertness monitor monitors the activation of all of the pilot's systems, switches, and panels, such as the on switches the pilot's control panels and radio transmitter. After a predefined amount of time elapses after the last control activation, the crew alertness monitor generates an advisory pilot response message. The pilot can clear the message by activating any control on any of the monitored systems, switches, or panels. If the pilot does nothing, the message repeated, and eventually followed by a warning message, and then alerting the pilot crew.

One drawback of existing alert systems, is that they are so easily reset (e.g., often by one simple press of a button), that they do not accurately detect if the person is alert, which is known by anyone who has a snooze button on their morning alarm (a simple press of a button will reset the alarm, although the person often goes right back to sleep without being alert enough to notice the alarm). Additionally, they only notify people in the vehicle and not others (e.g., the cabin crew, a supervisor, etc.). Conventional alert systems lack many useful features that improve alertness, especially for people with mundane tasks.

SUMMARY OF THE INVENTION

The present invention overcomes these and other deficiencies of the prior art by providing an alert interactive system designed to ensure that a person, such as an aircraft pilot, car or truck driver, soldier, sailor, or security professional, remains alert. The alert interactive system provides instructions and time for the person to enter a code, and provides an alert to that person (e.g., the operator) and others when the code is not entered timely and correctly, as the person is not alert, and may be taking a short nap, fully asleep, or unconsciousness.

In an embodiment of the invention, an alert interactive system comprises: a processor configured to provide instructions to a person for entering a code; a timer attached to the processor configured to convey to the person when the code is to be entered; an entry means attached to the processor configured to receive the code; and an alert means attached to the processor configured to indicate to others when the code is not entered.

The processor may detect when the code may not be entered correctly or timely. The instructions may be provided during a cruise portion of travel or when the person needs assistance to be alert. The instructions may be selected from the group consisting of: audio instructions, visual instructions, touch screen instructions, trivia questions, and any combination thereof. The person may be selected from the group consisting of: a pilot, a flight crew, a car or truck driver, a train conductor, a train crew, a soldier or sailor on watch, a security professional, a student, an audience member, a person convicted of driving under the influence (DUI) or driving while intoxicated (DWI), and any combination thereof. The entry means may be selected from the group consisting of: a display, a touch screen, an alphanumeric key, a microphone, an alphanumeric rotate-select-and-press dial, and any combination thereof. The alert means may be selected from the group consisting of: audio alert, visual alert, notification to the person, notification to flight attendant, notification to air traffic control, notification to employer, notification stored in the alert interactive system, and any combination thereof. The system may further comprise a warning means prior to the alert means.

In another embodiment of the invention, a method comprises: providing instructions to a person for entering a code using a processor; conveying to the person when the code is to be entered; receiving the code; and indicating to others when the code is not entered. The processor may detect when the code is not entered correctly or timely. The instructions may be provided during a cruise portion of travel or when the person needs assistance to be alert. The instructions may be selected from the group consisting of: audio instructions, visual instructions, touch screen instructions, trivia questions, and any combination thereof. The person may be selected from the group consisting of: a pilot, a flight crew, a car or truck driver, a train conductor, a train crew, a soldier or sailor on watch, a security professional, a student, an audience member, a person convicted of driving under the influence (DUI) or driving while intoxicated (DWI), and any combination thereof.

In a further embodiment of the invention, a device comprises: a processor configured to provide instructions to a person for entering a code; a timer attached to the processor configured to convey to the person when the code is to be entered; and a display attached to the processor configured to receive the code, wherein the processor is configured to indicate to others when the code is not entered. The processor may detect when the code is not entered correctly or timely. The instructions may be provided during a cruise portion of travel or when the person needs assistance to be alert.

An advantage of the present invention is that the alert interactive system detects not only people who are asleep or unconscious, but also people that are semi-asleep or distracted, forming a more comprehensive alert interactive system. Additionally, the alert interactive system can notify not only the person who is not alert, but others. Also, the alert interactive system mitigates intentional naps and unintentionally falling asleep.

Another advantage is the increased level of alertness required, as the alert interactive system requires the user to be active and use cognitive functions, unlike a snooze button like system. Further, the alert interactive system promotes scanning of instruments to detect an onset of a mechanical failure. Additionally, the alert interactive system has several alert features, including a countdown clock with visual alerts, aural chimes and horn, tracking of pilot's unresponsiveness, and ability to contact multiple people, such as the pilot, the cabin crew, and air traffic control.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF EMBODIMENTS

Figure 1:
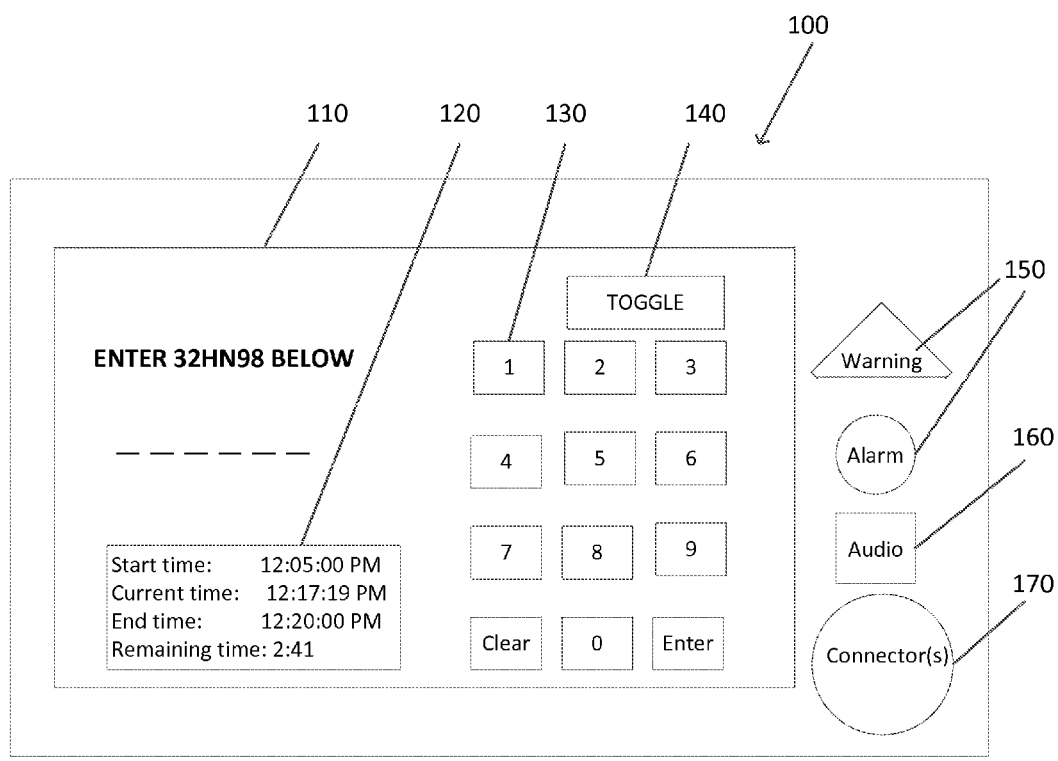
FIG. 1 illustrates an alert interactive system according to an embodiment of the invention.

Further features and advantages of the invention, as well as the structure and operation of various embodiments of the invention, are described in detail below with reference to the accompanying FIGS. 1-16, wherein like reference numerals refer to like elements. Although the invention is described in the context of an airplane setting with a pilot, one of ordinary skill in the art readily appreciates that the present invention can be implemented in other types of settings, e.g., a conductor on a train, a driver of a car or truck, a professional at a security checkpoint, a vehicle operator using a vehicle's cruise control, a student in a lecture, a professional at work, an application on a phone (e.g., iPhone App), a wakeup alarm, a sailor or soldier on watch, and other settings where it is useful to be alert.

The present invention provides an alert interactive system designed to ensure that a person, such as an aircraft pilot, car or truck driver, soldier or sailor, or security professional, remains alert. The alert interactive system provides instructions and time for the person to enter a code, and provides an alert to that person and others when the code is not entered timely and correctly, as the person is not alert, and may be taking a short nap, fully asleep, or unconsciousness.

FIG. 1 illustrates an alert interactive system 100 (AIS) according to an embodiment of the invention. The alert interactive system 100 includes a display 110 having a timer 120, a keypad 130, and a toggle button 140. The alert interactive system 100 includes one or more alert indicators 150, audio components 160, and connectors 170. The display 110 provides a visual means for the pilot to receive instructions and enter a code (e.g., an alert code). The timer 120 shows the pilot how much more time there is until the code must be entered. The keypad 130 is a means for entering the code. The toggle button 140 allows the pilot to switch between letters and numbers. The alert indicators 150 display warning and alarm indications based on the timer 120 and the pilot's entry of the code. The audio components 160, such as a microphone and speaker, provide an audio means for the pilot to receive instructions, enter a code, and hear a warning and alarm. The connectors 170 receive power and send and receive communications between the alert interactive system 100 and other electronics.

The alert interactive system 100 provides a person, such an aircraft pilot (e.g., captain, first officer, flight crew for a multiple flight crew aircraft, etc.), with instructions for entering a code, and one or more alerts when the code is not entered timely and correctly. The alert interactive system 100 provides instructions, allows code entry, and alerts, through both audio (i.e., aural) and visual means, such as the display 110, keypad 130, and audio components 160. The alert interactive system 100 is designed to emit audio and visual alerts if the pilot does not enter the code.

The alert interactive system 100 can perform as a stand-alone system and can perform as an interconnected system. When operated as a stand-alone system, the alert interactive system 100 does not require connections to the aircraft, other than for power. The alert interactive system 100 may also be powered from an internal battery. The stand-alone system can be configured to store statuses internally, recording incidents that occur while the alert interactive system 100 is armed. Statuses can include times that the alert interactive system 100 is armed and disarmed, along with instances where the pilot does not correctly or timely enter the code. The pilot's incorrect or untimely entry of the code is evidence that the pilot is not alert, meaning he could be distracted or falling asleep.

The interconnected system can be connected to air traffic control and to the cabin crew, who serve as backups if the pilot is not alert (e.g., if the pilot has fallen asleep). The interconnected system can be interfaced to other systems in the aircraft (e.g., electrical power system, Flight Management Systems-FMS, Global Positioning System-GPS Navigators, Mode-S Transponders, the aircraft's electrical communication system, the plane's black box, etc.). The alert interactive system 100 can also be integrated within the Flight Management Systems such that a separate stand-alone or interconnected box would be duplicative and therefore not needed. The Flight Management System would include all the features and capabilities of the alert interactive system 100. The Flight Management System and air traffic control systems are easy to update through software. The interconnected system can quickly and easily transmit and store status information, such as alerts. In the car embodiment, the interconnected system can be connected to a police department or the highway patrol, who receive alerts regarding impaired drivers.

The display 110 (e.g., touchscreen) provides a visual means for the person to receive instructions and enter a code. The display 110 includes a timer 120, a keypad 130, and a toggle button 140. In one embodiment, the display 110 is a touchscreen Toshiba Thin Film Transistor (TFT) color Liquid Crystal Display (LCD) display with a scratch resistant coating. The scratch resistant coding on the surface of the LCD protects the display 110 from scratching while keeping the font readable. The display 110 can include more or less of the components illustrated. For example, the display 110 can also include the alert indicators 150. Alternatively, the display 110 can just include the instructions be separate from the timer 120, the keypad 130, and toggle button 140. The display 110 can eliminate buttons, such as the toggle button 140, or can have additional features, such as a button that matches the brightness of the display 110 to the brightness of the cockpit instrument panel, so that the pilot does have to separately adjust the brightness of the display 110.

The timer 120 can be referred to as a countdown clock, as it reveals the time remaining until the code must be entered. The timer 120 can also show the start time, current time, and end time. The current time can be formed from an internal Greenwich Mean Time (GMT) clock, which records when the system is activated. In another embodiment, the timer 120 is a countdown clock that just displays the number of minutes and seconds remaining until the code is required. In one embodiment, the timer 120 is set to countdown from 15 minutes. In another embodiment, the timer 120 is set to countdown from another time (e.g., 5 minutes, 10 minutes, etc.). In one embodiment, the amount of time is based on Federal Aviation Administration (FAA) regulations or recommendations.

The timer 120 engages the pilot, and makes it less likely for him to take an intentional nap, or fall asleep accidentally. Napping is more likely to occur while the plane is at cruising altitudes, although operation does not need to be limited only to when the airplane is cruising. The alert interactive system 100 is useful at any time when the person needs assistance to be alert. The timer 120 promotes alertness and the periodic glancing at the time remaining on the display 110 and may promote scanning of other instruments.

In one embodiment, the pilot must wait for the timer 120 to reach zero before entering the code. The pilot has a limited time to enter this code, which will reset the timer 120 such that the process starts over. In another embodiment, the pilot can enter and reset the code at any time during the countdown.

The keypad 130 (e.g., entry means) is a means for entering the code to reset the timer. Although the keypad 130 is illustrated as being as a static keypad, one of ordinary skill in the art is familiar with other designs to enter the code. The keypad 130 may be an alphanumeric rotate-select-and-press dial. If the code is not timely entered, a warning alert is displayed and sounded, and in one embodiment, the warning alert is followed by a second and third opportunity to enter the code. If the code is not timely entered, an alarm display and sound follow. In one embodiment, the code is a random combination of letters, numbers, or characters visually displayed on the screen, or transmitted by sound through the speaker. By making the code different each time, this advantageously requires greater concentration and alertness to enter it correctly.

In another embodiment, the pilot is assigned a discreet password, e.g., a pilot's Personal Identification Number (PIN), and the code is set as the discreet password. The discreet password advantageously requires the pilot, and not a flight attendant or criminal, to be able to correctly enter the code correctly. The pilot may be given more than one opportunity to enter or say the code correctly, as even incorrect entry of the code indicates that the pilot is awake, although possibly not alert. In one embodiment, the pilot is given five opportunities to enter the correct code.

In another embodiment, the code is designed to be awaking, such as a trivia game that the pilot can play at predefined intervals (e.g., every 15 minutes). The trivia game can be a well-known show, such as Who Wants to be a Millionaire, Jeopardy, Cash Cab, and Are You Smarter than a Fifth Grader, or can be a separately designed game, set of challenge questions, or rapid fire brain games. Topics can include: SAT questions, aviation-related questions, geography questions, memory games, simple math equations, fill in the blank, and IQ questions. The alert interaction system 100 is highly customizable in this fashion. In this awaking embodiment, the pilot can see how many other pilots answered the question correctly, and submit his questions to colleagues for their input.

As previously discussed, the present invention can be implemented in other types of settings where an alert is useful. In one embodiment, the display 110 is placed on the Head-Up Display (HUD). The HUD can be displayed in a car, a train, an iPhone application, or an airplane. The keypad 130 can be replaced by a steering wheel or phone button to detect tired and drunk driving. For safety, the instructions can be delivered, and the response can be received, through the audio components 160. The audio components 160 can be louder than ambient noise levels. The response can also be received by the entry of a button on the steering wheel. The driver may be given one or more opportunities to press the button an appropriate number of times, determined by the administrator.

In one embodiment, the keypad 130 includes both alpha and numeric characters. In another embodiment, the keypad includes only of one of alpha and numeric characters. The characters can have adjustable font styles and character spacings.

The toggle button 140 allows the person to switch the display 110 between letters and numbers. In another embodiment, letters, numbers, and characters are displayed without a need for the toggle button 140. Additionally, the toggle button 140 may not be needed if only letters or only numbers are used.

The alert indicators 150 display warning and alarm indications based on the timer 120 and the pilot's entry of the code. A warning indicator serves as a reminder for the pilot to enter the code. In one embodiment, the warning indicator lets the pilot know that he failed to timely or correctly enter the code. In another embodiment, the warning indicator lets the pilot know that his opportunity to enter the code is approaching. The warning can be visual and audio, such as a flashing colored light or a warning chime, which is removed by entering the code.

The alarm indicates that the timer 120 has expired and can be more prominent than the warning. For example, the alarm may be louder, brighter, and noticeable by people other than the pilot. In one embodiment, the alarm triggers auxiliary indicator lights in the cabin to flash on and off, such that the passengers, flight attendants, and cabin crew are notified and can alert the pilot. The alert interactive system 100 can include a push-to-test button that is pressed as part of the preflight checklist, which checks that the auxiliary indicator lights will function properly during the cruise portion of the flight.

In one embodiment, air traffic control radar screens, also called data blocks, can monitor the pilot's alertness. The radar screen displays the aircraft's call sign, destination or next fix, altitude, type of aircraft, Visual Flight Rules (VFR), Instrument Flight Rules (IFR), and airspeed. The radar screen can also display an "AIS" symbol representing the alert interactive system 100, on the screen when the system is activated at cruise altitude. If the required code is not entered within the allotted time, the AIS symbol flashes on the air traffic controller's radar screen and the air traffic controller can contact the pilot or someone else in the plane. The alert interactive system 100 provides triple redundancy, as the pilot, air traffic controller, and cabin crew are alerted of the pilot's incorrect or untimely entries. These three parties can receive a notification, an audio alarm, a visual alarm, and/or a warning.

The pilot knows ahead of time that his lack of a timely response or inability to enter a correct response, evidencing a lack of alertness, notifies others, such as the alert interactive system, the flight attendants, and the air traffic controllers.

The audio components 160, such as a microphone and speaker, provide an audio means for the person to receive instructions, enter a code, and hear a warning and alarm. The processor can have voice recognition technology, such that the microphone is an additional method for entering the code. The sound can be adjustable.

The connectors 170 receive power for the alert interactive system 100 and allow communications between the alert interactive system 100 and other electronics. Connectors 170 include a power connector (e.g., for aircraft power 28 volts direct current), a data bus connector (e.g., for an ARINC-429 data bus), a data and control signals connector (e.g., for a RS-232 signal). The connectors 170 may allow the alert interactive system 100 to transmit specific information to the National Air System (NAS) Air Traffic Control (ATC).

Figure 2:
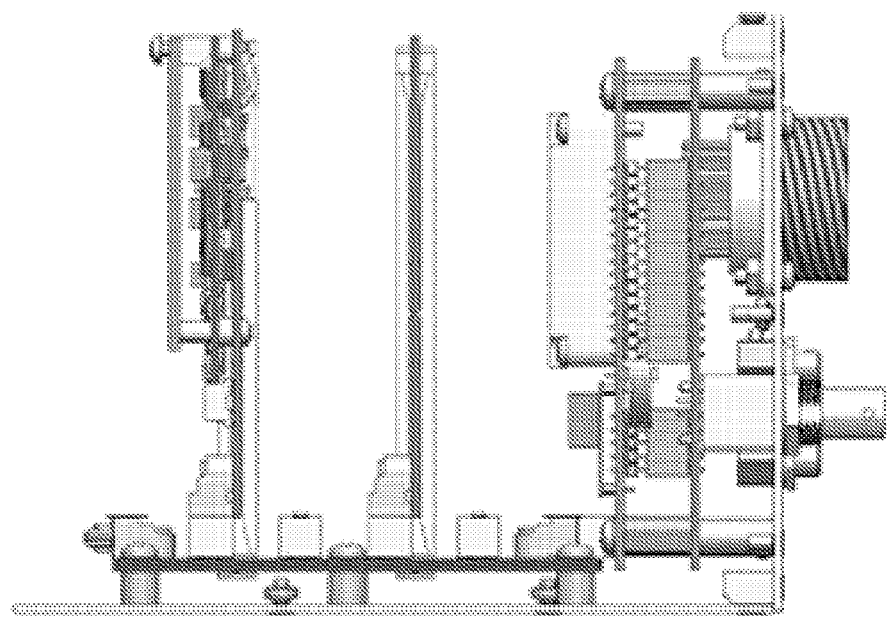
FIGS. 2-3 illustrate side elevation and prospective views of the hardware components of the alert interactive system according to an embodiment of the invention.
Figure 3:
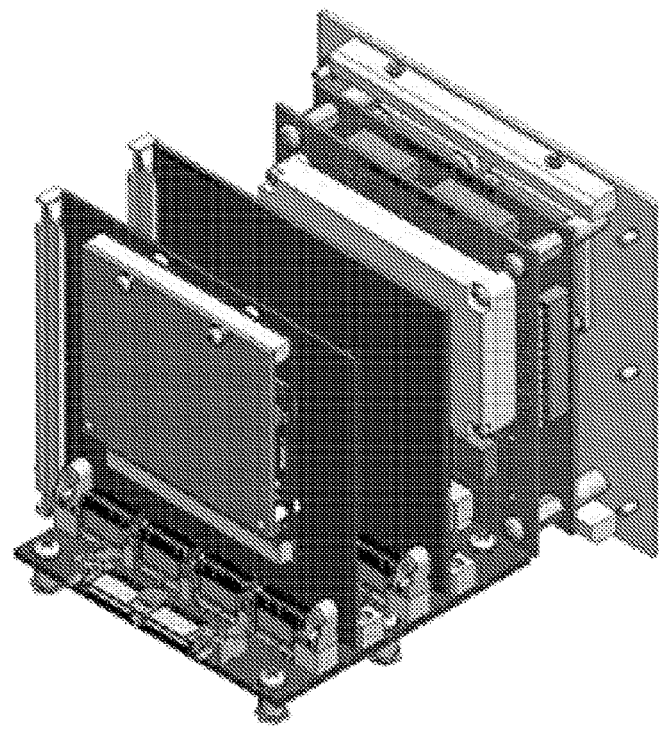

FIGS. 2-3 illustrate side elevation and prospective views of the hardware components of the alert interactive system 100 according to an embodiment of the invention. The hardware components include assembly boards. Assembly boards can include an LCD display electronics board assembly, a microprocessor central processing unit (CPU) board assembly (e.g., an Intel atom microprocessor), a board assembly with one side having a power supply board and the other side having a connector housing interface. Other assembly boards can include a random access memory (RAM) card, an analog and digital circuit board card, an input/output (I/O) card, design cards, internal electronics, and modular boards. The interface has one or more connectors, such as a circular electrical connector and a power connector.

The alert interactive system 100 can be a single Line Replaceable Unit (LRU), with an enclosure designed to install easily, protect electronics in harsh environments, and have a rugged housing (e.g., milled aluminum enclosure). The assembly boards are securely mounted to the enclosure.

In one embodiment, the alert interactive system 100 has a small footprint of four inches high, seven inches long, and five inches wide, weighing 1.1 pounds. In another embodiment, the alert interactive system 100 has a large footprint of four inches high, 10 inches long, and eight inches wide, weighing 1.4 pounds. Both embodiments are compact and do not take up too much cockpit space. In one embodiment, the alert interactive system 100 has a single circular connector that provides all electrical connections between the alert interactive system 100 and the aircraft. The large footprint allows for existing features to be larger (e.g., font size), and allows for the addition of more features (e.g., numeric and alpha characters). The alert interactive system 100 is typically positioned somewhere that allows easy access for the pilot.

Figure 4:
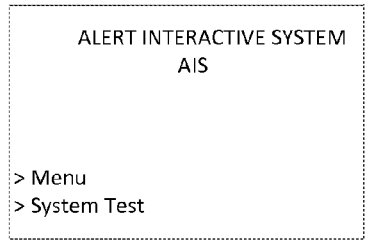
FIGS. 4-13 illustrate display screens of the alert interactive system according to an embodiment of the invention.

FIGS. 4-13 illustrate display screens of the alert interactive system 100 according to an embodiment of the invention. FIG. 4 illustrates a home screen upon initial power up before takeoff, allowing the pilot to access the menu and perform a system test of the alert interactive system 100. The display screen shows logos for the alert interactive system 100 along with a menu option and system test option. The display screen can show other features, such as a system part number and software load part number.

The system test includes a checklist of steps, including an air traffic control functional test of the alert interactive system 100, a test of the auxiliary indicator lights, and automatic or manual activation of the alert interactive system 100. The alert interactive system 100 can also perform other tests, such as a self-test of the static and non-volatile memories.

Figure 5:
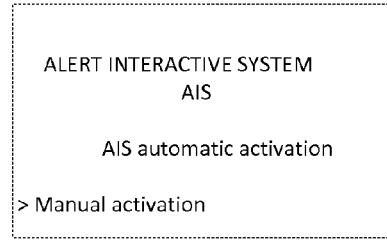

FIG. 5 illustrates a display screen for automatic or manual activation. Automatic activation may allow the Flight Management System to recognize when the plane has entered the cruise portion of the flight. Manual activation allows the pilot to perform this task. Manual activation may be reserved for a stand-alone configuration, and an automatic activation may be included for an interconnected system. In another embodiment, the alert interactive system 100 is activated on the ground as part of the crew checklist.

Figure 6:
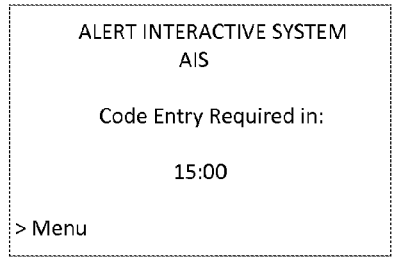

FIG. 6 illustrates a countdown clock display screen which may be started during the cruise portion of the flight. A countdown clock of 15 minutes may be started, where the time is measured in increments of one second. In one embodiment, the code is required to be entered shortly after the 15 minutes have elapsed. In another embodiment, the code must be entered at any time during the countdown. The countdown time can be determined by an administrator. In another embodiment, the countdown time is determined by the pilot or an operator. Correct entry of the code resets the countdown clock.

The display screen gives a menu option. The menu provides additional features, such as setup during the ground operation checklist and a tutorial. The tutorial can explain how the countdown clock functions during flight (e.g., active during cruise, reduced during menu operations, etc.). In one embodiment, the menu is accessible during ground operations and during cruise, but not during take-off, climb, descent, and landing. The countdown clock can be active during cruise, but not during ground operations, take-off, climb, descent, and landing. While in the menu (at cruise), the countdown clock continues to run and be shown. While in the menu, the countdown clock can be reduced in size and moved to the lower right hand corner of the screen. In one embodiment, when a small time remains (e.g., 10 seconds), the menu screen is automatically exited and the pilot is returned to the countdown screen. When a small time remains, the menu option can indicate that the menu is currently not available (e.g. the menu option is crossed out or has an X to replace the > symbol). After the code is entered correctly, the countdown clock is automatically reset (e.g., to 15 minutes) and the menu is accessible.

The cruise portion of flight is less task-oriented than take-off, climb, descent, and landing, as the pilot has a lower workload. During the cruise portion, the pilot is more likely to become drowsy or fall asleep. Many pilots purposely nap during this time. As such, the alert interactive system 100 may remain deactivated during take-off, climb, descent, and landing, but activated during the cruise portions. If an emergency arises during the cruise portion of the flight, the alert interactive system 100 may have a quick-off emergency deactivation switch which will enter an emergency code into the alert interactive system 100. In one embodiment, the airline company and the Federal Aviation Administration (FAA) is notified when the quick-off emergency deactivation switch is deactivated during the cruise portion of the flight.

Figure 7:

FIG. 7 illustrates a display screen for an embodiment of entering the code at any time during the countdown. The pilot can prompt this screen by beginning to enter his discreet PIN number. The pilot can have a certain time to enter the PIN once beginning (e.g. 10 seconds) and a certain number of opportunities to enter the PIN correctly (e.g., five chances), or the alert interactive system 100 provides visual or audio alerts and notifications to the cabin crew or air traffic control. Alternatively, the code can be displayed adjacent to the countdown such that the pilot can see how much time is remaining while entering the code.

Figure 8:
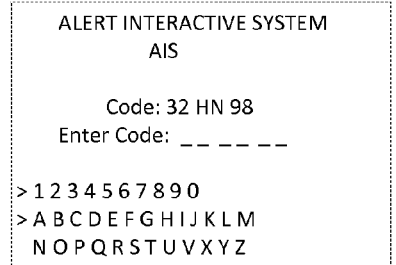

FIG. 8 illustrates a display screen for entering the code. This screen displays the code and prompts for an entry once the countdown clock reaches zero. As the pilot types in the code, the underscore lines are replaced by the code entry. The prompt gives the pilot a certain amount of time to enter the code (e.g., 10 seconds, 30 seconds, one minute, etc.), as determined by an administrator. Once the code is entered correctly, the countdown clock resets and the process begins again.

In this embodiment, both numbers and letters are shown on the screen without the need for the toggle button 140, and the pilot enters the numbers on the touchscreen display. The style and spacing of the numbers and letters can be determined and customized by the administrator. In a vehicle environment, it may be safer to provide a code using audio instructions that are short enough to memorize, such that the driver does not need to take his eyes off the road or his hands off the wheel.

Figure 9:
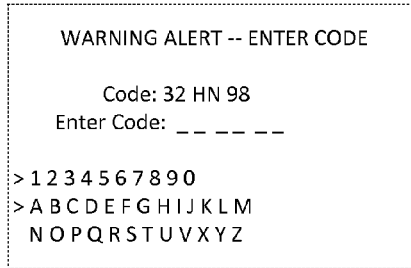

FIG. 9 illustrates a display screen with a warning alert for when the pilot has not attempted to enter the code. A warning chime can be sounded to alert the pilot. If the pilot does not enter the code within another time period (e.g., 10 seconds, 30 seconds, etc.) an alarm sounds. If another period of time passes without entry of the code, others may be notified to alert the pilot (e.g., air traffic control, cabin crew, etc.). In another embodiment, the warning screen informs the pilot ahead of time that his chance to enter the code is near. In a further embodiment, the warning screen warns the pilot that his time for entering the code has almost expired.

The alert interactive system 100 can be designed to detect an attempt to circumvent or disable the safety features. A potential attempt to disable the alert interactive system 100 may be to remove power while the plane is still on the ground or in the air (e.g., pulling the Circuit Breaker-CB switch). If the power is removed, regardless of whether the power is later restored, the alert interactive system 100 can detect this potential attempt to disable the safety features by having a small internal battery in the alert interactive system 100. The internal battery enables the alert interactive system 100 to record the length of time that the power was removed. These events are recorded and stored in an internal memory and provide a display a message for the maintenance crew to retrieve the internally stored events.

In one embodiment, an alert interactive system symbol may be displayed on the air traffic controller's data block. Disabling the alert interactive system will prompt the alert interactive system symbol to flash on the data block, and prompt an inquiry from ATC.

Figure 10:
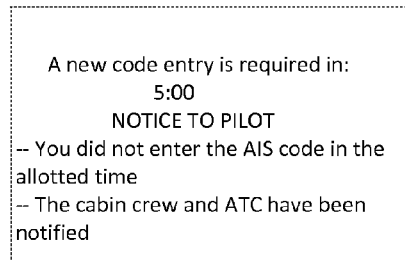

FIG. 10 illustrates a display screen with a new time period and notice for the pilot who did not timely enter the code. The alert interactive system 100 is intended to alert others as a useful tool or buddy as opposed to a punitive tool. The new time period may be shorter than the original time period (e.g., five minutes). The notice may inform the pilot that he did not enter the code in the allotted time, he did not respond to the warning chime or the warning alarm, the cabin indicator needs to be reset, and that lack of response notifications have been sent to the memory, company dispatch officer, and air traffic control.

Figure 11:
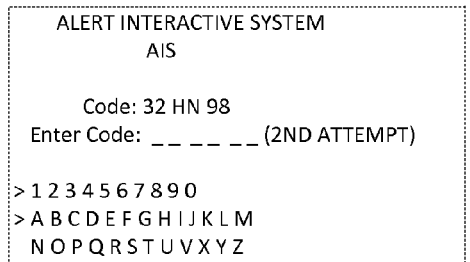

FIG. 11 illustrates a display screen after a pilot attempts to enter the code, but enters it incorrectly. Before prompting the pilot for a second attempt, the pilot may be alerted of the incorrect entry through a flashing error message configurable by the administrator, such as font that changes colors (e.g., flashing "incorrect entry" four times for four seconds). The pilot is given an allotted time to enter the code on the second attempt (e.g., 10 seconds, 30 seconds, etc.). If the code is entered correctly on the second attempt, the countdown screen reappears and the timer is reset to 15 minutes such that the countdown begins again. The menu option remains inaccessible from the time the countdown clock reaches a certain time (e.g., 10 seconds), during the second and subsequent code entry attempts, and until the proper code is entered. Entry of the proper code automatically restores the countdown clock (e.g., to 15 minutes). Once the countdown screen is displayed, the menu option becomes available again.

Figure 12:
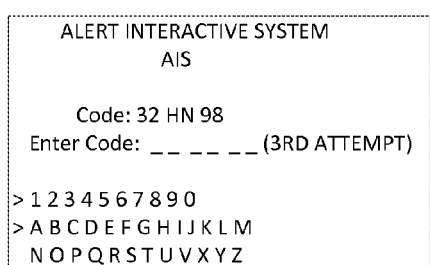

FIG. 12 illustrates a display screen for a third attempt which would appear if the code is incorrectly entered again. The pilot may be given several chances to correctly type in the code, because assuming it is the pilot that is attempting to enter the code, he is awake. However, multiple mistyped entries can be evidence that the pilot is not alert and evidence that someone who does not know the pilot's PIN number is attempting the entry. In one embodiment, the pilot is given five attempts to type in the correct code.

Figure 13:
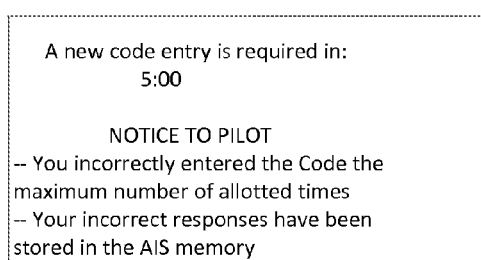

FIG. 13 illustrates a display screen with a notice to the pilot for incorrectly entering the code a maximum number of times. The notice may inform the pilot that he did not enter the code correctly within the maximum number of allotted times, the cabin indicator needs to be reset, and that incorrect entry notifications have been sent to the memory, company dispatch officer, and air traffic control.

Figure 14:
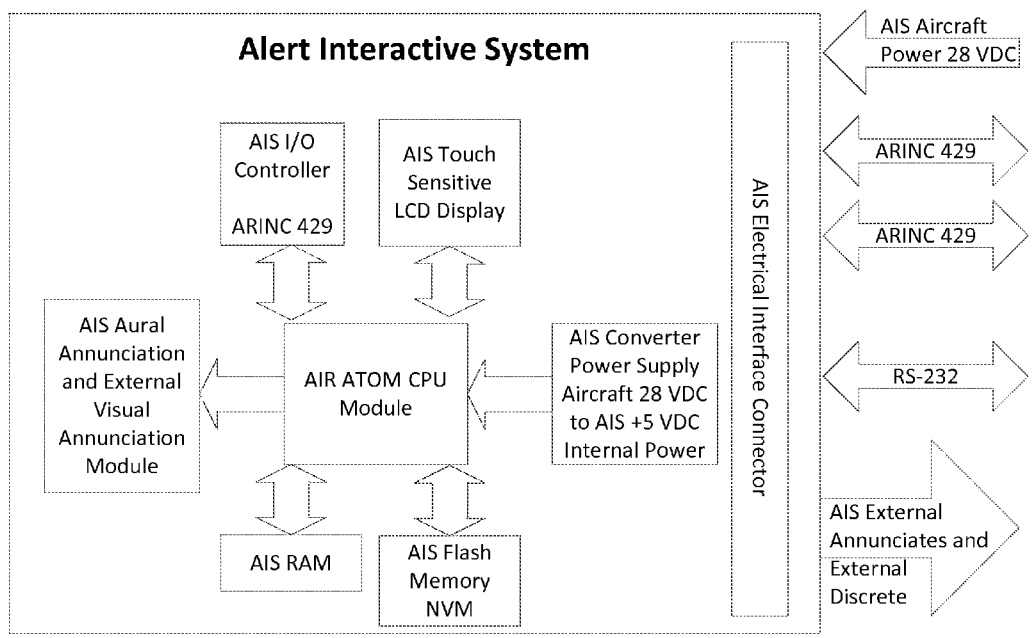
FIG. 14 illustrates a block diagram of the alert interactive system according to an embodiment of the invention.

FIG. 14 illustrates a block diagram of the alert interactive system 100 according to an embodiment of the invention. The block diagram comprises a power supply providing power to a processor, which is connected to a controller, display, memory, and an annunciation module. The processor can be an Intel air atom CPU module and powered by a five volt direct current internal power, which was converted down from the aircraft's 28 volt direct current power. The controller can be an input-output ARINC-429 controller. The memory includes RAM and non-volatile memory such as flash memory. The processor supplies information to the annunciation module which includes audio alerts to a speaker and visual alerts to notify others as well (e.g., in an aural and external discrete visual annunciation module). The display can be an LCD touch screen which is menu driven to allow the pilot to navigate through the features.

In a large footprint embodiment, a large LCD display shows both alpha and numeric characters. In a small footprint embodiment, a small LCD display does not show both alpha and numeric characters (e.g., only numeric characters with a toggle button for switching between alpha and numeric, etc.). After the pilot is prompted to enter the code, the pilot selects the appropriate numbers and letters by pressing the LCD image of that number or letter. In another embodiment, the code is typed in using the Flight Management System keyboard.

The display and the processor compensate for use during turbulent flight conditions. The display can have large touch-screen characters for correctly entering the code. And the processor can compensate for multiple erratic screen touches. The block diagram receives signals and power through an electrical interface connector.

Figure 15:
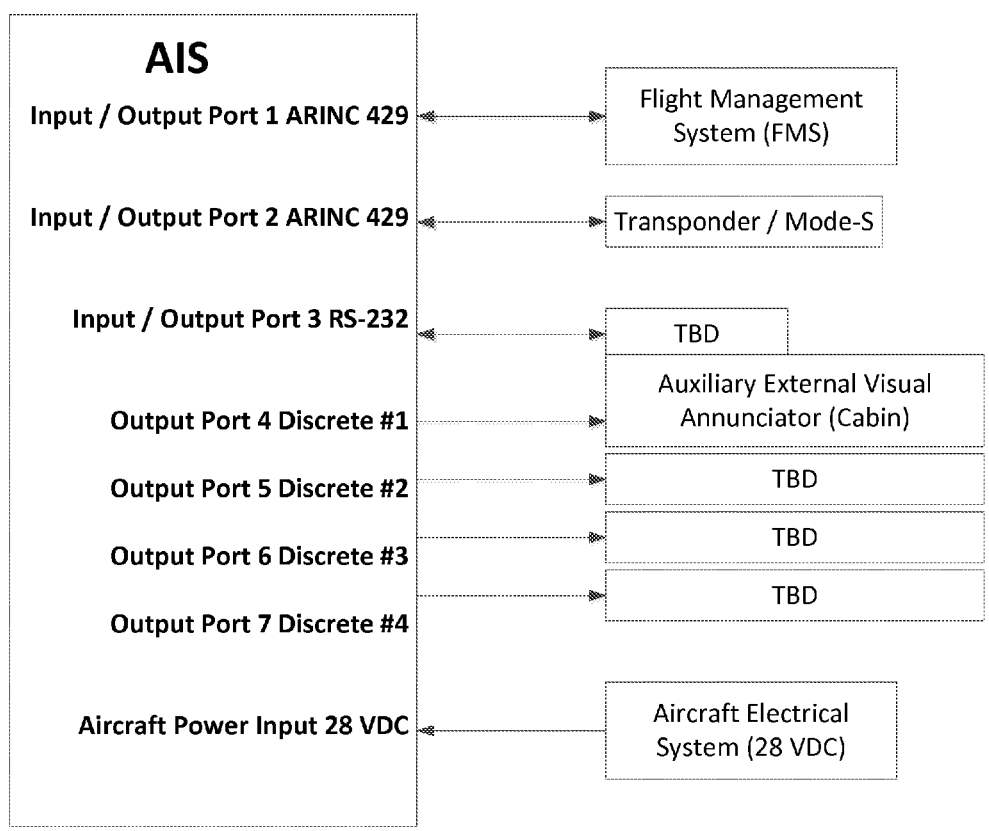
FIG. 15 illustrates an input/output interconnection diagram according to an embodiment of the invention.

FIG. 15 illustrates an input/output interconnection diagram according to an exemplary embodiment of the invention. Data can be sent and received using two data buses (e.g., ARINC-429), and a data and control signal (e.g., RS-232). ARINC-429 provides a digital interface between the alert interactive system 100 and the aircraft's systems, such as the Flight Management System and other navigation systems. The digital interface allows the code to be entered on an aircraft system other than the alert interactive system 100, such as the Flight Management System. The digital interface can connect to an ARINC-429 port of the aircraft's transponder system for the alert interactive system 100 to transmit status messages to Air Traffic Control when the pilot may not be alert (e.g., does not respond to programmed prompts), indicating that the pilot may have fallen asleep.

The alert interactive system 100 also supports external visual annunciator operation, where the alert interactive system 100 can be connected to an external visual annunciator which is typically located in the cabin crew area. The alert interactive system 100 signals the external visual annunciator when the pilot has not responded to the programmed prompts indicating that the pilot may have fallen asleep.

The power received can be from the electrical power of the aircraft, which is often 28 volt direct current. The alert interactive system 100 draws approximately less than one amp (e.g., 0.8 amps) of current, along with down converting the aircraft's power to five volts, and as such, the alert interactive system 100 advantageously dissipates low power. In another embodiment, the alert interactive system is battery powered.

A set of spare signals can be included for additional features to be added. The digital interface allows the alert interactive system 100 to receive updates from the aircraft's system to watch for specific flight plan data, such as the cruise portion of the flight. The cruise portion of flight is less task-oriented with a lower workload and a more likely time for the pilot to become drowsy or fall asleep.

The alert interactive system 100 provides multiple features to suit the person and the environment. The alert interactive system 100 can be coupled with any number of systems or switches (e.g., Flight Management System, exterior light switch, transponder, etc.) to automatically shut off before the pilot taxis onto the active runway or descends to land. The alert interactive system 100 can come in a large footprint size and a small footprint size. The alert interactive system 100 can be manually activated by the pilot or automatically activated by interconnected systems.

The alert interactive system 100 is versatile in its operations and configurations. This facilitates customization to the type of aircraft and to the pilot preference (e.g., font size, display brightness, etc.). The display brightness can be manually controlled by an option on the display or by a component on the airplane's instrument panel.

The alert interactive system 100 provides safety benefits that may interest foreign countries as well. Countries that use their air traffic control radar screens to display safety alerts (e.g., conflict alerts, terrain alert, etc.) that flashes letters and alerts on the radar screen, such as Japan and Germany, may be interested in software updates that allow the radar screen to interact with the alert interactive system 100.

Figure 16:
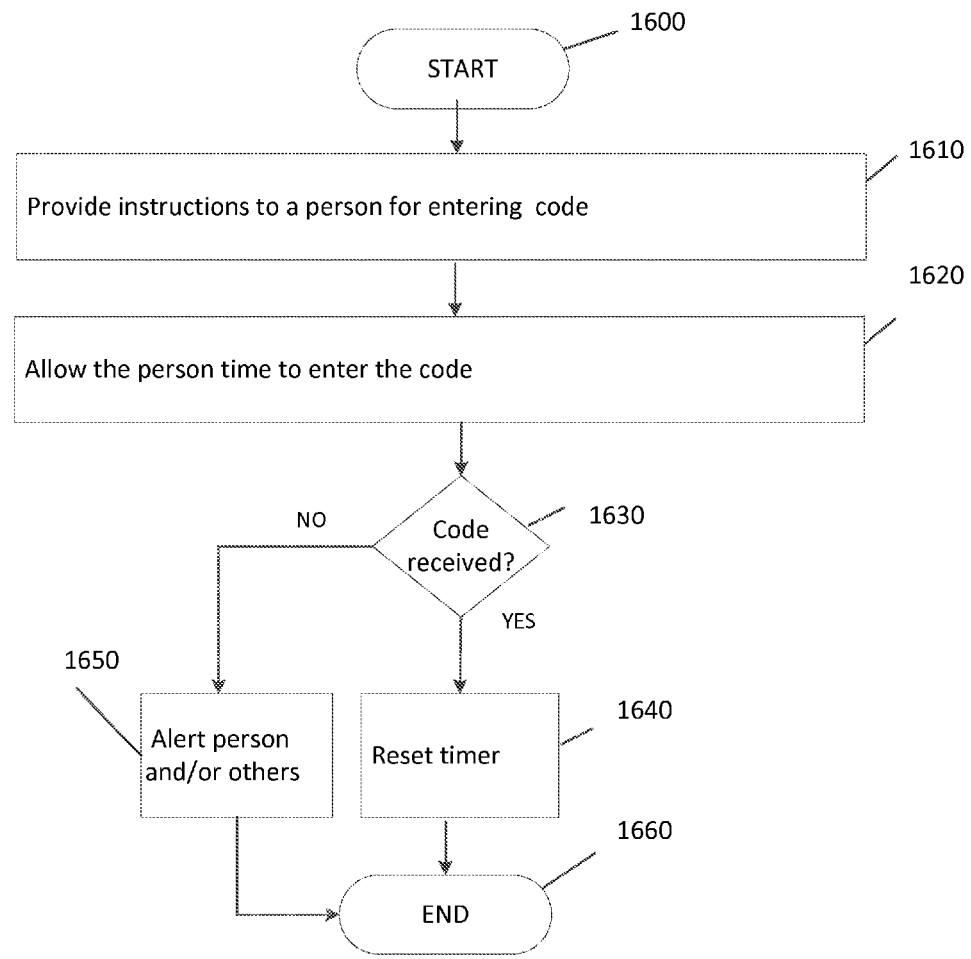
FIG. 16 illustrates a flow chart showing a process of alerting a person or others according to an embodiment of the invention.

FIG. 16 illustrates a flow chart showing a process of alerting a person or others according to an embodiment of the invention. The process starts at step 1600. At step 1610, a processor provides instructions to the person for entering a code. Then, at step 1620, a timer allows the person time to enter the code. Next, the processor detects if the code was received at decision step 1630. The code needs to be entered both timely and correctly. In one embodiment, the user has a certain number of chances to re-enter the code if typed incorrectly (e.g., five chances), but the person has less chances (e.g., zero chances) to re-enter the code if no input is received. If the correct code is received, the process proceeds to step 1640 which resets the timer. If the correct code is not received, the process proceeds to step 1650 to alert the person or others. In one embodiment, the process alerts both the person and others. The process ends at step 1660.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multi-threaded processing, interrupt processing, or multiple processors, rather than sequentially.

The steps of a method or algorithm described in connection with the embodiments disclosed herein may be embodied directly in a computer or electronic storage, in hardware, in a software module executed by a processor, or in a combination thereof. A software module may reside in a computer storage such as in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In an impaired or drunk driving application of the alert interactive system, a person, such as a driver convicted of one or more DUI's, may have the alert interactive system installed in his car. The alert interactive system can be connected to the police or the highway patrol. Like breathalyzer systems, this system helps keep drunk drivers off the road, by not allowing the car to start when the driver is not alert. Additionally, this system operates while the driver is driving as well.

Drunk driving is deadly, as almost 11,000 people were killed in 2009 due to in alcohol related accidents. Currently, some states, such as California, are heavily advertising on electronic freeway signs to call 911 and report suspected drunk drivers when the driver is not alert. The alert interactive system can have a signal viewable by others located outside of the car when the driver is not alert. The signal can be one or more flashing lights (like a turn signal or hazards) or a message (e.g., "Impaired driver, call 911."), or a signal otherwise viewable by other drivers. The other drivers can take precautions in view of this signal, such as being more alert around this car, providing more space behind this car, driving away from this car, or contacting the authorities, as the driver is not alert, and potentially drunk.

Additionally, this system can test the driver while driving (in case a sober "friend" who is not riding with a drunk driver helped overcome the breathalyzer or this system in order to start the car). This system can be placed in a location such that the driver, and not the passenger, has access (such as on the left side of the steering wheel). This system can also detect tampering, and send a notice or disable vehicle features in response to such tampering (e.g., shut down the car). Further, the system can adjust the throttle position to decrease the speed of the car with a sleepy driver. The slowdown speed and rate is customizable (e.g., the speed can be decreased 10 miles per hour (mph) every 15 seconds), the car can exit cruise control, the car can brake, etc.

The alert interactive system 100 (e.g., unit, box, iPad type device, etc.) can be used in control towers for air traffic controllers. The alert interactive system 100 could be programmed to begin operation at a set time every evening when transmissions are known to be sporadic. The alert interactive system 100 would detect inactivity or lack of transmissions over the radios. The alert interactive system 100 countdown clock would start and require code inputs at scheduled times keeping the controller awake, alert, and engaged. If at any time a pilot transmits to the air traffic control tower, or vice versa, such as the tower providing a new altitude or heading, the countdown clock would temporarily hold or freeze and then re-set to 15 minutes or resume countdown operation when, for example, five minutes have passed and there is no activity over the radios. This temporary hold feature applies to the alert interactive system 100 embodiment used by pilots and the alert interactive system 100 embodiment used by air traffic controllers. In this way, neither the pilot nor the air traffic controller will be distracted by the alert interactive system 100 clock or require inputs at critical times. If the controller does not respond to prompts, a notification could be sent to a supervisor.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. An alert interactive system for testing an airplane pilot's alertness, the system comprising:
    a processor configured to provide instructions to a pilot for entering a code or a response to a question;
    an interface to communicate with cabin crew and an air traffic control center;
    a timer attached to the processor configured to convey to the pilot when the code or the response is to be entered;
    an entry means attached to the processor configured to receive the code or the response interactively from the pilot; and
    an alert means attached to the processor configured to indicate to the pilot, air traffic control center, and cabin crew when the code or the response is not entered.

2. The system of claim 1, wherein the processor detects when the code or the response is not entered correctly.

3. The system of claim 1, wherein the processor detects when the code or the response is not entered timely.

4. The system of claim 1, wherein the instructions are provided during a cruise portion of travel or when the pilot needs assistance to be alert.

5. The system of claim 1, wherein the instructions are selected from the group consisting of: aviation related questions, trivia questions, and any combination thereof.

6. The system of claim 1, wherein the entry means are selected from the group consisting of: a display, a touch screen, an alphanumeric key, a microphone, an alphanumeric rotate-select-and-press dial, and any combination thereof.

7. The system of claim 1, wherein the alert means are selected from the group consisting of: audio alert, visual alert, notification to the pilot, notification to flight attendant, notification to air traffic control, notification to employer, notification stored in the alert interactive system, and any combination thereof.

8. The system of claim 1, wherein the processor is further configured to issue a warning to the pilot and to receive a response to the warning, and issue an alert to the pilot, cabin crew, and the air traffic control center that no response to the warning has been received.

9. An interactive method for testing an airplane pilot's alertness, the method implemented on a processor and comprising:
    providing instructions to a pilot for entering a code or a response to a question using a processor;
    establishing a communication link between the processor and an air traffic control center and cabin crew;
    conveying to the pilot when the code or the response is to be entered interactively by the pilot;
    determining whether the code or the response has been entered by the pilot; and
    indicating to the pilot, cabin crew, and air traffic control center when the code or the response to the question is not entered by the pilot.

10. The method of claim 9, wherein the processor detects when the code or the response is not entered correctly.

11. The method of claim 9, wherein the processor detects when the code or the response is not entered timely.

12. The method of claim 9, wherein the instructions are provided during a cruise portion of travel or when the pilot needs assistance to be alert.

13. The method of claim 9, wherein the instructions are selected from the group consisting of: aviation related questions, trivia questions, and any combination thereof.

14. The method of claim 9, further comprising the steps of:
    issuing a warning to the pilot,
    determining whether a response to the warning was received, and
    issuing an alert to the pilot, cabin crew, and the air traffic control center that no response to the warning was received.

15. An alert interactive device for testing an airplane pilot's alertness, the device comprising:
    a processor configured to provide instructions to a pilot for entering a code or a response to a question;
    an interface to communicate with an air traffic control center and cabin crew;
    a timer attached to the processor configured to convey to the pilot when the code or the response is to be entered interactively by the pilot; and
    a display attached to the processor configured to receive the code or the response, wherein the processor is configured to indicate to the pilot and air traffic control center when the code or the response is not timely entered.

16. The device of claim 15, wherein the processor detects when the code is not entered correctly.

17. The device of claim 15, wherein the processor detects when the code is not entered timely.

18. The device of claim 15, wherein the instructions are provided during a cruise portion of travel or when the pilot needs assistance to be alert.

19. The device of claim 15, wherein the processor is further configured to issue a warning to the pilot and to receive a response to the warning, and issue an alert to the pilot, cabin crew, and the air traffic control center that no response to the warning has been received.

* * * * *

UNITED STATES PATENT AND TRADEMARK OFFICE
CERTIFICATE OF CORRECTION

| | | |
|---|---|---|
| PATENT NO. | : 8,866,623 B2 | Page 1 of 1 |
| APPLICATION NO. | : 13/346617 | |
| DATED | : October 21, 2014 | |
| INVENTOR(S) | : Sharon Lee Hamolsky | |

It is certified that error appears in the above-identified patent and that said Letters Patent is hereby corrected as shown below:

On the Title Page, change item (12) to Hamolsky

On the Title Page, item (76) Inventor "Hamolsky Lee Sharon" should read -- Sharon Lee Hamolsky --

Signed and Sealed this

Thirteenth Day of January, 2015

Michelle K. Lee
*Deputy Director of the United States Patent and Trademark Office*